Nov. 22, 1960 — G. P. CAMPBELL — 2,961,038
ARM REST
Filed Oct. 1, 1956

INVENTOR.
GROSVENOR P. CAMPBELL
BY Whittemore Hulbert & Belknap
ATTORNEYS 2,961,038

ARM REST

Grosvenor P. Campbell, Highland Park, Mich.
(226 Beaupre Road, Grosse Pointe Farms 36, Mich.)

Filed Oct. 1, 1956, Ser. No. 613,065

1 Claim. (Cl. 155—198)

Automobiles as manufactured at the present day are usually provided with arm rests mounted on the inner sides of the doors for the comfort of the occupant of the seat adjacent thereto. For the left door of the front seat adjacent to the steering wheel the rest is so positioned that the arm may be supported thereby while the hand is grasping the wheel. Also, turning of the wheel for a small amount is permitted without removing the arm from the rest. It has been found however that the elbow supported by the rest is not always in comfortable position due to the fact that it may be pressed against the inner panel of the door above the rest while steering the car. With some makes of cars there is a bead or trim strip so positioned that the forearm or elbow may press in contact therewith adding to the discomfort.

It is the object of the invention to obtain a construction of arm rest which will avoid the objectionable features as above described. To this end the invention consists in a construction which includes a cushion surface extending above the portion of the rest which supports the arm and between the arm and the inner panel of the door. The invention further consists in a construction in which the said cushion surface merges with a cushion beneath the arm, both being so fashioned as not to interfere with the necessary movement of the arm in steering. The invention further consists in the specific construction as hereinafter set forth.

Figures 1, 2, 3:
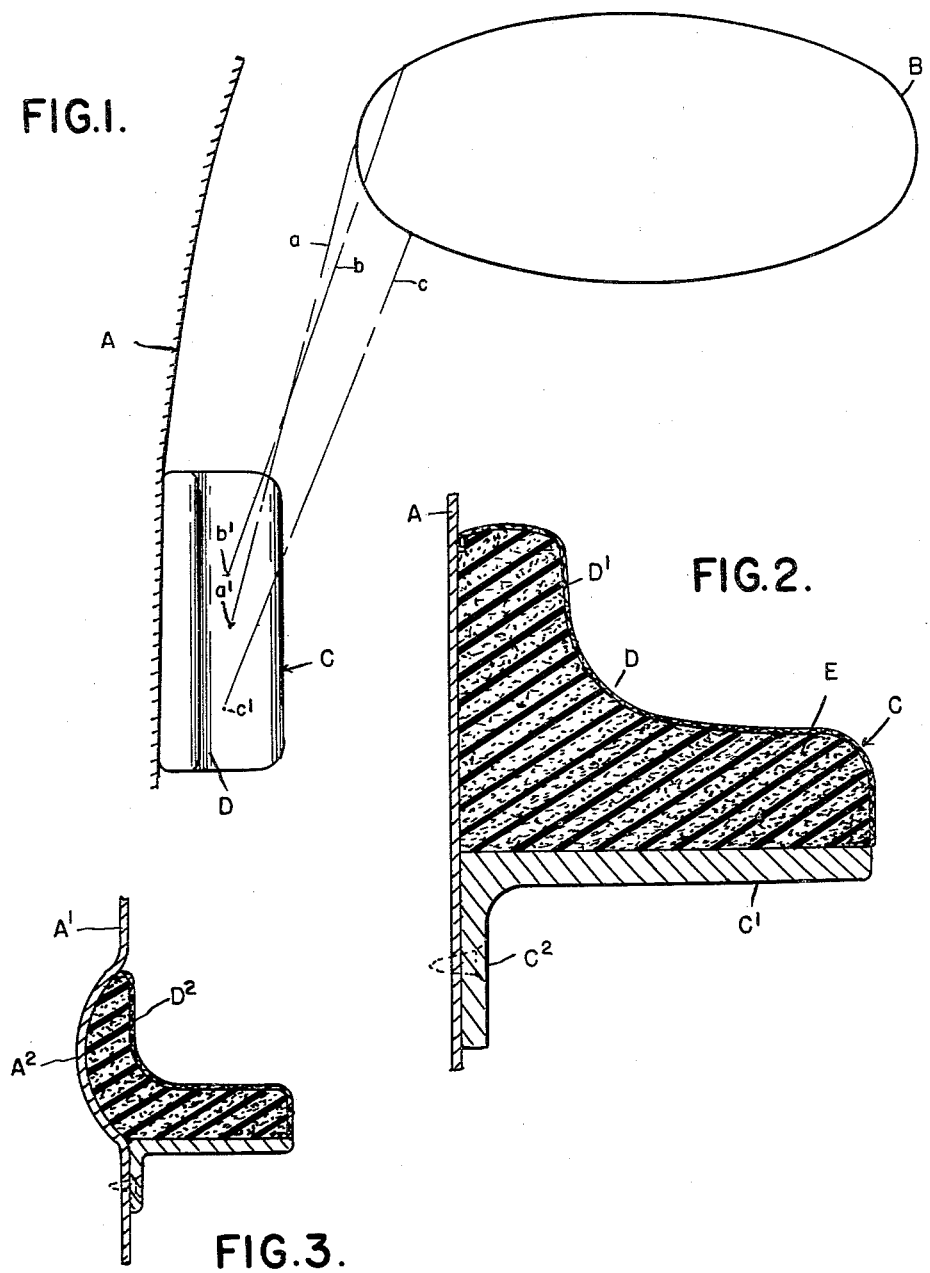
Fig. 1 is a plan view illustrating my improved arm rest mounted on the left front door of the automobile and diagrammatically indicating the position of the steering wheel relative thereto.
Fig. 2 is a cross section through the rest.
Fig. 3 is a similar view to Fig. 2 showing a modified construction.

A indicates the inner panel of the left front door of an automobile and B is the steering wheel which in plan view is an ellipse. C is the arm rest mounted on the panel A and $a$, $b$ and $c$ indicate in dotted lines the approximate position of the forearm in relation to said rest and wheel respectively in normal position when the car is travelling straight forward and when turned to the right or the left. It will be noted that during movement of the wheel between said dotted lines the elbow will move forward or back on the rest as indicated by $a'$, $b'$ and $c'$. It is usual to cushion the top of the rest but as above described the portion of the door panel above the rest is not so cushioned and the elbow may come in contact therewith with a feeling of discomfort. I have therefore devised a construction of arm rest having a cushion D which extends not only over the top of the rest but also upward at $D'$ adjacent to the door panel above the same. As specifically shown in Fig. 2 a single cushion extends around both horizontal and vertical portions and is curved to form a trough fitting about the elbow and forearm. Obviously separate cushions might be used for the same purpose. The cushion is preferably filled with a very yieldable resilient material E, such as foam rubber, which permits it to conform to all portions of the elbow and forearm in contact therewith and without interference with arm movements required in steering. Thus, fatigue, especially after long hours of driving, as well as soreness of the elbow or arm is avoided. The rigid portion of the arm rest C may include a bottom member $C'$ and an angle flange $C^2$ forming a bracket or any other construction for holding the cushion in position.

A modified construction is shown in Fig. 3 in which the door panel $A'$ has formed therein an indentation $A^2$ forming a recess for receiving the upwardly extending portion $D^2$ of the cushion. This will prevent occupying any of the space within the car by said upwardly extending cushion the outer face of which is substantially flush with the general surface of the panel A.

What I claim as my invention is:

An arm rest for automobile doors comprising a bracket secured to an inner panel of the door, said inner panel having an indentation therein forming a recess above said bracket, a cushion on said bracket which is extended longitudinally of the automobile to afford support for the elbow of the operator of the automobile during manipulation of the steering wheel, said cushion having an upwardly extending portion located within said recess to have its outer face substantially flush with the general surface of said panel.

References Cited in the file of this patent

UNITED STATES PATENTS

| | | |
|---|---|---|
| 1,873,414 | Jarvis | Aug. 23, 1932 |
| 1,962,508 | Josseylyn | June 12, 1934 |
| 2,005,198 | Morrison | June 18, 1935 |
| 2,088,709 | Lejuste | Aug. 3, 1937 |
| 2,569,834 | Smith | Oct. 2, 1951 |